(12) United States Patent
Shimizu et al.

(10) Patent No.: US 10,377,370 B2
(45) Date of Patent: Aug. 13, 2019

(54) HYBRID VEHICLE

(71) Applicant: TOYOTA JIDOSHA KABUSHIKI KAISHA, Toyota-shi, Aichi-ken (JP)

(72) Inventors: Yu Shimizu, Nagakute (JP); Takashi Ando, Nisshin (JP); Takeshi Kishimoto, Nagakute (JP); Masaya Amano, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 282 days.

(21) Appl. No.: 15/331,947

(22) Filed: Oct. 24, 2016

(65) Prior Publication Data

US 2017/0113680 A1    Apr. 27, 2017

(30) Foreign Application Priority Data

Oct. 27, 2015 (JP) .................. 2015-211075

(51) Int. Cl.
*B60W 20/50* (2016.01)
*B60K 6/26* (2007.10)
(Continued)

(52) U.S. Cl.
CPC .............. *B60W 20/50* (2013.01); *B60K 6/26* (2013.01); *B60K 6/28* (2013.01); *B60K 6/365* (2013.01);
(Continued)

(58) Field of Classification Search
CPC ...... B60W 20/50; B60W 10/06; B60W 10/08; B60L 11/02; B60L 11/08; B60L 11/14; B60L 11/18; B60L 3/003; B60L 3/006; B60L 3/0061; B60L 3/0092; B60L 3/04; B60L 15/007; B60L 15/2063; B60K 6/26; B60K 6/365; B60K 6/445
See application file for complete search history.

(56) References Cited

U.S. PATENT DOCUMENTS 8,583,308 B2 * 11/2013 Miyazaki ................ B60L 1/003
701/22
2001/0048226 A1 * 12/2001 Nada .................... F02N 11/0859
290/40 C
(Continued)

FOREIGN PATENT DOCUMENTS

| JP | 2001-329884 A | 11/2001 |
| JP | 2013-203116 | 10/2013 |
| JP | 2014-184880 A | 10/2014 |

*Primary Examiner* — Jacob S. Scott
*Assistant Examiner* — Lori Wu
(74) *Attorney, Agent, or Firm* — Finnegan, Henderson, Farabow, Garrett & Dunner, LLP

(57) ABSTRACT

A hybrid vehicle may include an engine, a first rotating electric machine, an output shaft, a planetary gear mechanism, a second rotating electric machine, a battery, an inverter and an electronic control unit. The electronic control unit may be programmed to perform inverterless traveling control. The inverterless traveling control may be control for causing the hybrid vehicle to travel by placing the inverter in a gate cut-off state, and driving the engine. The electronic control unit also may be programmed to interrupt current flowing between the first rotating electric machine and the battery when a shift range other than a forward range is selected, during the inverterless traveling control.

5 Claims, 12 Drawing Sheets

(51) Int. Cl.

| | | |
|---|---|---|
| *B60K 6/28* | (2007.10) | |
| *B60K 6/365* | (2007.10) | |
| *B60K 6/445* | (2007.10) | |
| *B60L 3/04* | (2006.01) | |
| *B60L 15/00* | (2006.01) | |
| *B60W 10/06* | (2006.01) | |
| *B60W 10/08* | (2006.01) | |
| *B60W 20/10* | (2016.01) | |
| *H02P 27/08* | (2006.01) | |
| *B60L 3/00* | (2019.01) | |
| *B60L 15/20* | (2006.01) | |
| *B60L 50/50* | (2019.01) | |
| *B60L 50/10* | (2019.01) | |
| *B60L 50/13* | (2019.01) | |
| *B60L 50/16* | (2019.01) | |

(52) U.S. Cl.
CPC .............. *B60K 6/445* (2013.01); *B60L 3/003* (2013.01); *B60L 3/0061* (2013.01); *B60L 3/0092* (2013.01); *B60L 3/04* (2013.01); *B60L 15/007* (2013.01); *B60L 15/2063* (2013.01); *B60L 50/10* (2019.02); *B60L 50/13* (2019.02); *B60L 50/16* (2019.02); *B60L 50/50* (2019.02); *B60W 10/06* (2013.01); *B60W 10/08* (2013.01); *B60W 20/10* (2013.01); *H02P 27/08* (2013.01); *B60L 2220/42* (2013.01); *B60L 2240/421* (2013.01); *B60L 2240/423* (2013.01); *B60L 2240/443* (2013.01); *B60L 2240/486* (2013.01); *B60Y 2200/92* (2013.01); *B60Y 2400/61* (2013.01); *Y02T 10/6239* (2013.01); *Y02T 10/6286* (2013.01); *Y02T 10/645* (2013.01); *Y02T 10/646* (2013.01); *Y02T 10/70* (2013.01); *Y02T 10/7005* (2013.01); *Y02T 10/7077* (2013.01); *Y02T 10/7275* (2013.01); *Y10S 903/91* (2013.01); *Y10S 903/93* (2013.01)

(56) References Cited

U.S. PATENT DOCUMENTS

| | | | | |
|---|---|---|---|---|
| 2007/0099748 | A1* | 5/2007 | Matsubara | B60K 6/445 477/3 |
| 2009/0058339 | A1* | 3/2009 | Kitano | B60K 6/445 318/400.22 |
| 2014/0368142 | A1* | 12/2014 | Uchida | H02P 6/06 318/400.21 |

* cited by examiner

HYBRID VEHICLE

CROSS-REFERENCE TO RELATED APPLICATION

This application is based on and claims the benefit of priority of Japanese Patent Application No. 2015-211075 filed on Oct. 27, 2015, which is incorporated herein by reference in its entirety.

TECHNICAL FIELD

The present disclosure relates to a hybrid vehicle, and more particularly to a hybrid vehicle capable of traveling using power of at least one of an engine and a rotating electric machine.

BACKGROUND

A hybrid vehicle including an engine, first and second motor-generators, and a planetary gear mechanism is known. The planetary gear mechanism includes a sun gear coupled to the first motor-generator, a ring gear coupled to the second motor-generator, and a carrier coupled to the engine. An electric system of the hybrid vehicle includes a battery and inverter. The inverter is operable to convert electric power between the battery, and the first motor-generator and the second motor-generator. In the hybrid vehicle, when there is a request for start-up of the engine, the engine is cranked by electrically rotating the first motor-generator by use of the inverter. If the rotational speed of the engine reaches a predetermined value, through cranking, fuel ignition of the engine is started, and the engine is started.

In the hybrid vehicle configured as described above, when the inverter cannot normally perform operation to electrically drive the first and second motor-generators, it becomes necessary to take appropriate measures to protect the devices. In Japanese Patent Application Publication No. 2013-203116 (JP 2013-203116 A), for example, control for cutting off or blocking gates of the inverter, when the first and second motor-generators cannot be normally electrically driven, is disclosed.

Generally, shift ranges (travel ranges) of a vehicle include, for example, forward ranges, such as D (drive) range and B (brake) range, and non-forward ranges, such as P (parking) range, R (reverse) range, and N (neutral) range.

When the inverter cannot normally perform operation to electrically drive the first and second motor-generators as described above, control may be performed to cause the vehicle to travel in a limp-home mode by driving the engine while placing the inverter in gate cut-off states. In the present disclosure, this control will be called "inverterless traveling control". During inverterless traveling control, the first motor-generator is mechanically rotated by use of torque of the engine, while the inverter is placed in the gate cut-off states, so that counter-electromotive voltage is developed in the first motor-generator. At this time, the first motor-generator generates braking torque (counter-electromotive torque) that acts in such a direction as to impede rotation of the first motor-generator. With the counter-electromotive torque applied from the first motor-generator to the sun gear, drive torque that acts in a positive direction as reaction force of the counter-electromotive torque is generated in the ring gear. By using the drive torque, the vehicle is able to travel in the limp-home mode.

In a condition where the hybrid vehicle under inverterless traveling control is temporarily stopped, for example, the shift range may be changed over to a non-forward range, such as N range. In this case, it is considered to stop the engine, as a measure to prevent counter-electromotive torque and resulting drive torque from being generated. However, since the inverter is in the gate cut-off states during inverterless traveling control, the engine may not be re-started by cranking, using the first motor-generator, once the engine is stopped. As a result, the vehicle may not be able to continue traveling in the limp-home mode.

Thus, when the shift range is a non-forward range during inverterless traveling control, it is desired to enable the vehicle to continue limp-home traveling by keeping the engine in a driven state, while preventing generation of drive torque caused by counter-electromotive torque that becomes unnecessary torque.

SUMMARY

Embodiments of the present disclosure provide a technology for use in a hybrid vehicle operable to perform inverterless traveling control, which technology enables the vehicle to continue limp-home traveling, while preventing generation of unnecessary torque without stopping an engine, when the shift range is a non-forward range.

According to embodiments of the disclosure, a hybrid vehicle may include an engine, a first rotating electric machine having a permanent magnet in a rotor, an output shaft connected to drive wheels, a planetary gear mechanism, a second rotating electric machine connected to the output shaft, a battery, inverter, and an electronic control unit. The planetary gear mechanism mechanically may connect the engine, the first rotating electric machine, and the output shaft, such that reaction force of output torque of the first rotating electric machine acts on the output shaft, when the engine is in a driven state. The inverter may be operable to convert electric power between the battery, and the first rotating electric machine and the second rotating electric machine. The electronic control unit may be configured to perform inverterless traveling control. The inverterless traveling control may be control for causing the hybrid vehicle to travel by placing the inverter in a gate cut-off state, and driving the engine. The electronic control unit may be configured to interrupt current flowing between the first rotating electric machine and the battery, when a shift range of the hybrid vehicle is a range other than forward ranges, during the inverterless traveling control.

In certain embodiments of the present disclosure, when the shift range is operated to a range other than forward ranges during inverterless traveling control, current flowing between the first rotating electric machine and the battery may be interrupted. As a result, the current may stop flowing in the first rotating electric machine; therefore, braking torque (counter-electromotive torque) may be prevented from being generated by the first rotating electric machine. Accordingly, the vehicle is able to continue limp-home traveling, while preventing drive torque that becomes unnecessary torque from being generated when the shift range is in a range other than forward ranges, without stopping the engine.

The hybrid vehicle may further include a converter operable to raise a voltage applied from the battery and output the voltage to the inverter. The electronic control unit may be configured to interrupt the current flowing between the first rotating electric machine and the battery, by placing the converter in a gate cut-off state.

With the above arrangement, the converter for raising the voltage applied from the battery and outputting the voltage to the inverter can also be used for interrupting the current.

The hybrid vehicle may further include a relay provided on a pathway of current flowing between the first rotating electric machine and the battery. The electronic control unit may be configured to interrupt the current flowing between the first rotating electric machine and the battery, by opening the relay.

With the above arrangement, if the relay is provided, the above-described current can be interrupted even in the case where the converter is not provided.

The hybrid vehicle may further include a converter operable to raise a voltage applied from the battery and output the voltage to the inverter, and a relay provided on a pathway of current flowing between the first rotating electric machine and the battery. The electronic control unit may be programmed to detect the shift range, and may include a first control unit that controls the relay, and a second control unit that controls the converter. The first control unit may be programmed to interrupt the current flowing between the first rotating electric machine and the battery by placing the converter in a gate cut-off state, when there is no abnormality in communication between the first control unit and the second control unit, and the shift range is a range other than forward ranges, during the inverterless traveling control. On the other hand, the first control unit may be programmed to interrupt the current flowing between the first rotating electric machine and the battery by opening the relay, when there is an abnormality in the communication between the first control unit and the second control unit, and the shift range is a range other than the forward ranges, during the inverterless traveling control.

In embodiments according to the present disclosure, in the case where communication between the first control unit and the second control unit is normal, when the shift range is a range other than the forward ranges, the current may be interrupted by placing the converter in the gate cut-off state. When the current is interrupted by using the relay; there is a possibility that contacts of the relay may fuse and adhere to each other, due to concentration of current at the contacts. However, if the converter is used for interrupting current, it is possible to prevent generation of unnecessary torque, while avoiding contact adhesion in the relay. On the other hand, if there is an abnormality in the above-mentioned communication, information concerning the shift range cannot be transmitted from the first control unit to the second control unit. Therefore, even if the shift range is operated to a range other than the forward ranges, the second control unit cannot interrupt the current by placing the converter in the gate cut-off state. However, in embodiments according to the present disclosure, even when there is such a communication abnormality, the first control unit is operable to open the relay, so as to interrupt the current. Namely, prevention of generation of unnecessary torque can be prioritized, even though there is a possibility of contact adhesion; therefore, unnecessary torque can be more reliably prevented from being generated.

BRIEF DESCRIPTION OF THE DRAWINGS

Features of exemplary embodiments of the present disclosure will be described below with reference to the accompanying drawings, in which like numerals denote like elements, and wherein.

DETAILED DESCRIPTION OF EMBODIMENTS

Figure 1:
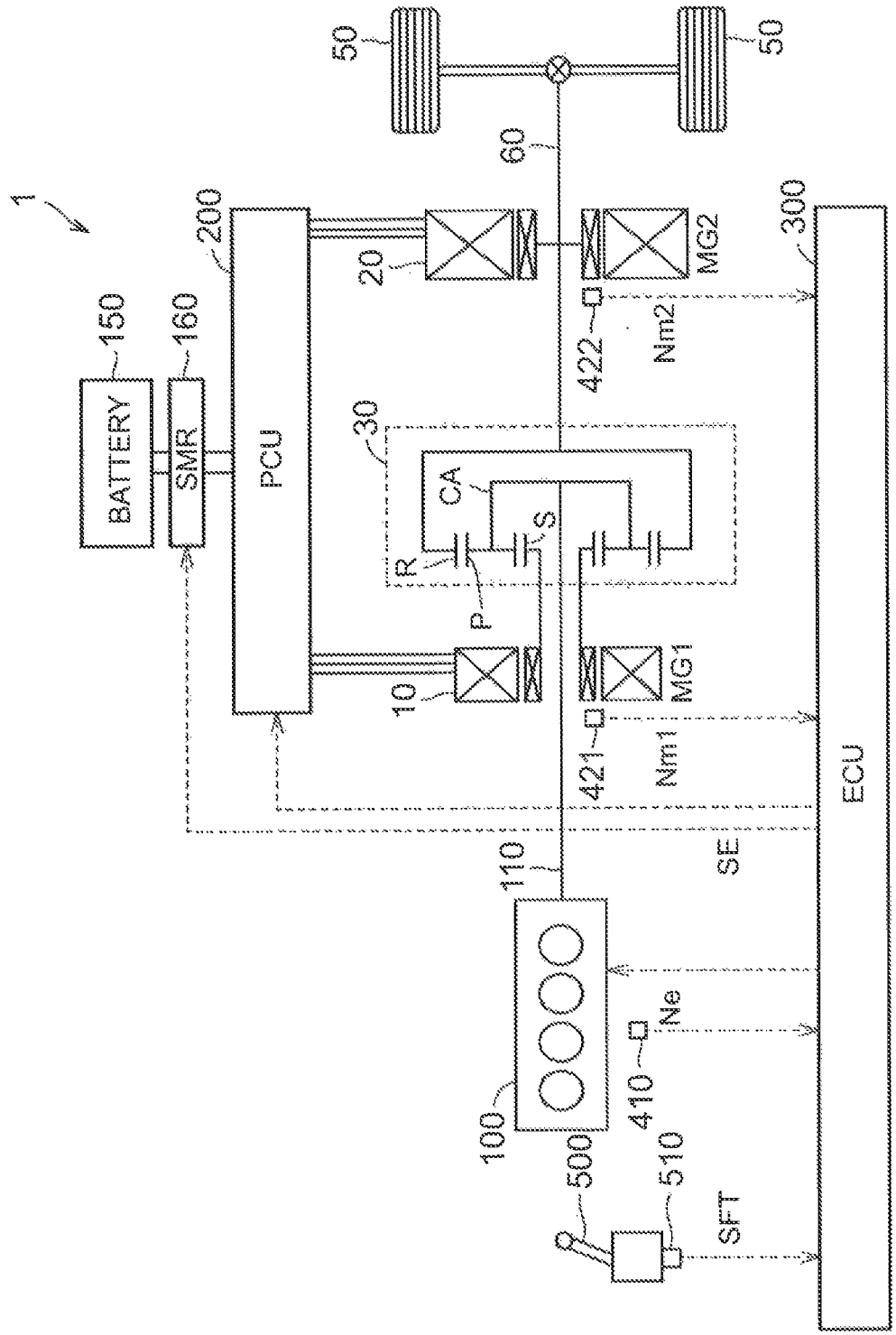
FIG. 1 is a block diagram schematically showing the overall configuration of a hybrid vehicle according to a first embodiment.

Some embodiments will be described in detail with reference to the drawings. In the drawings, the same reference numerals are assigned to the same or corresponding portions or components, of which explanation will not be repeated.

FIG. 1 is a block diagram schematically showing the overall configuration of a hybrid vehicle according to this embodiment. The vehicle 1 includes an engine 100, motor-generators 10, 20, planetary gear mechanism 30, drive wheels 50, output shaft 60 connected to the drive wheels 50, battery 150, system main relay (SMR) 160, power control unit (PCU) 200, and an electronic control unit (ECU) 300.

The vehicle 1 travels using power of at least one of the engine 100 and the motor-generator 20. During normal traveling that will be described later, the vehicle 1 is able to switch its traveling mode between an electric vehicle traveling (EV traveling) mode in which the vehicle 1 travels with power of the motor-generator 20 without using power of the engine 100, and a hybrid vehicle traveling (HV traveling) mode in which the vehicle 1 uses power of both the engine 100 and the motor-generator 20.

The engine 100 is an internal combustion engine, such as a gasoline engine or a diesel engine. The engine 100 generates power that enables the vehicle 1 to travel according to a control signal from the ECU 300. The power generated by the engine 100 is transmitted to the planetary gear mechanism 30.

The engine 100 is provided with an engine speed sensor 410. The engine speed sensor 410 detects the rotational speed Ne of the engine 100, and outputs a signal indicating the result of detection, to the ECU 300.

Each of the motor-generators 10, 20 is a three-phase AC permanent magnet type synchronous motor, for example. The motor-generator (first rotating electric machine) 10 rotates a crankshaft 110 of the engine 100, using electric power of the battery 150, when the engine 100 is started. In this connection, the vehicle 1 is not equipped with a starter that generates torque for cranking the engine 100 using electric power of an auxiliary battery (not shown).

The motor-generator 10 is also able to generate electric power, using power of the engine 100. The AC power generated by the motor-generator 10 is converted by the PCU 200 into DC power, which is then charged into the battery 150. The AC power generated by the motor-generator 10 may also be supplied to the motor-generator 20.

A rotor of the motor-generator (second rotating electric machine) 20 is coupled to the output shaft 60. The motor-generator 20 rotates the output shaft 60, using at least one of electric power supplied from the battery 150 and electric power generated by the motor-generator 10. The motor-generator 20 is also able to generate electric power through regenerative braking. The AC power generated by the motor-generator 20 is converted by the PCU 200 into DC power, which is then charged into the battery 150.

The motor-generator 10 is provided with a resolver 421. The resolver 421 detects the rotational speed Nm1 of the motor-generator 10, and outputs a signal indicating the result of detection, to the ECU 300. Similarly, the motor-generator 20 is provided with a resolver 422. The resolver 422 detects the rotational speed Nm2 of the motor-generator 20, and outputs a signal indicating the result of detection, to the ECU 300.

The planetary gear mechanism 30 is mechanically coupled to the engine 100, motor-generator 10 and the output shaft 60, such that torque can be transmitted among the engine 100, motor-generator 10 and the output shaft 60. More specifically, the planetary gear mechanism 30 includes a sun gear S, ring gear R, carrier CA, and pinion gears P, as rotational elements. The sun gear S is coupled to a rotor of the motor-generator 10. The ring gear R is coupled to the output shaft 60. The pinion gears P mesh with the sun gear S and the ring gear R. The carrier CA is coupled to the crankshaft 110 of the engine 100, and holds the pinion gears P such that the pinion gears P can rotate about themselves and rotate about the axis of the planetary gear mechanism 30.

The battery 150 is a rechargeable power storage device. The battery 150 includes a secondary battery, such as a nickel-hydrogen secondary battery or a lithium-ion secondary battery, as typical examples, or a capacitor, such as an electric double layer capacitor.

The SMR 160 is connected to power lines connecting the battery 150 and the PCU 200. The SMR 160 is opened or closed according to a control signal SE from the ECU 300, so as to bring the battery 150 and the PCU 200 into a selected one of an electrically connected state and an electrically disconnected state.

The PCU 200 raises the voltage of the DC power stored in the battery 150, and converts the raised voltage into AC voltage, which is supplied to the motor-generator 10 and the motor-generator 20. The PCU 200 also converts AC power generated by the motor-generator 10 and the motor-generator 20 into DC power, which is supplied to the battery 150. The configuration of the PCU 200 will be described in detail with reference to FIG. 2.

The vehicle 1 further includes a shift lever 500 and a position sensor 510. The shift lever 500 is a device with which the user sets a shift range of the vehicle 1. When the user operates the shift lever 500, the position sensor 510 detects the position (shift position) SFT of the shift lever 500, and outputs a signal indicating the result of detection to the ECU 300. The ECU 300 sets the shift range corresponding to the shift position SFT. The shift range is selected from, for example, forward ranges, such as D (drive) range and B (brake) range, and ranges (non-forward ranges), such as P (parking) range, R (reverse) range and N (neutral) range, other than the forward ranges.

The ECU 300 includes CPU (Central Processing Unit), memory, input/output buffer, etc. all of which are not shown in the drawings. For example, ECU 30 may be programmed to perform disclosed functions. Digitized instructions, which may be stored or retrieved, may be executed by ECU 30 to perform disclosed functions. The digitized instructions may be stored in a non-transitory computer-readable medium. For example, the ECU 300 is programmed to control each device so as to bring the vehicle 1 into a desired traveling state, based on signals from respective sensors and devices, and maps and programs stored in the memory. The control of various devices is not limited to processing by software, but may also be implemented by a dedicated hardware (electronic circuit).

When there is a request for starting the engine 100 while the engine 100 is stopped (while supply of fuel is stopped), the ECU 300 controls the PCU 200 (more specifically, an inverter 221 that will be described later) so that the motor-generator 10 generates torque for cranking the engine 100. Then, if the rotational speed Ne of the engine 100 reaches a predetermined value through cranking, fuel injection control and ignition control of the engine 100 are started. In this manner, the engine 100 is started.

Figure 2:
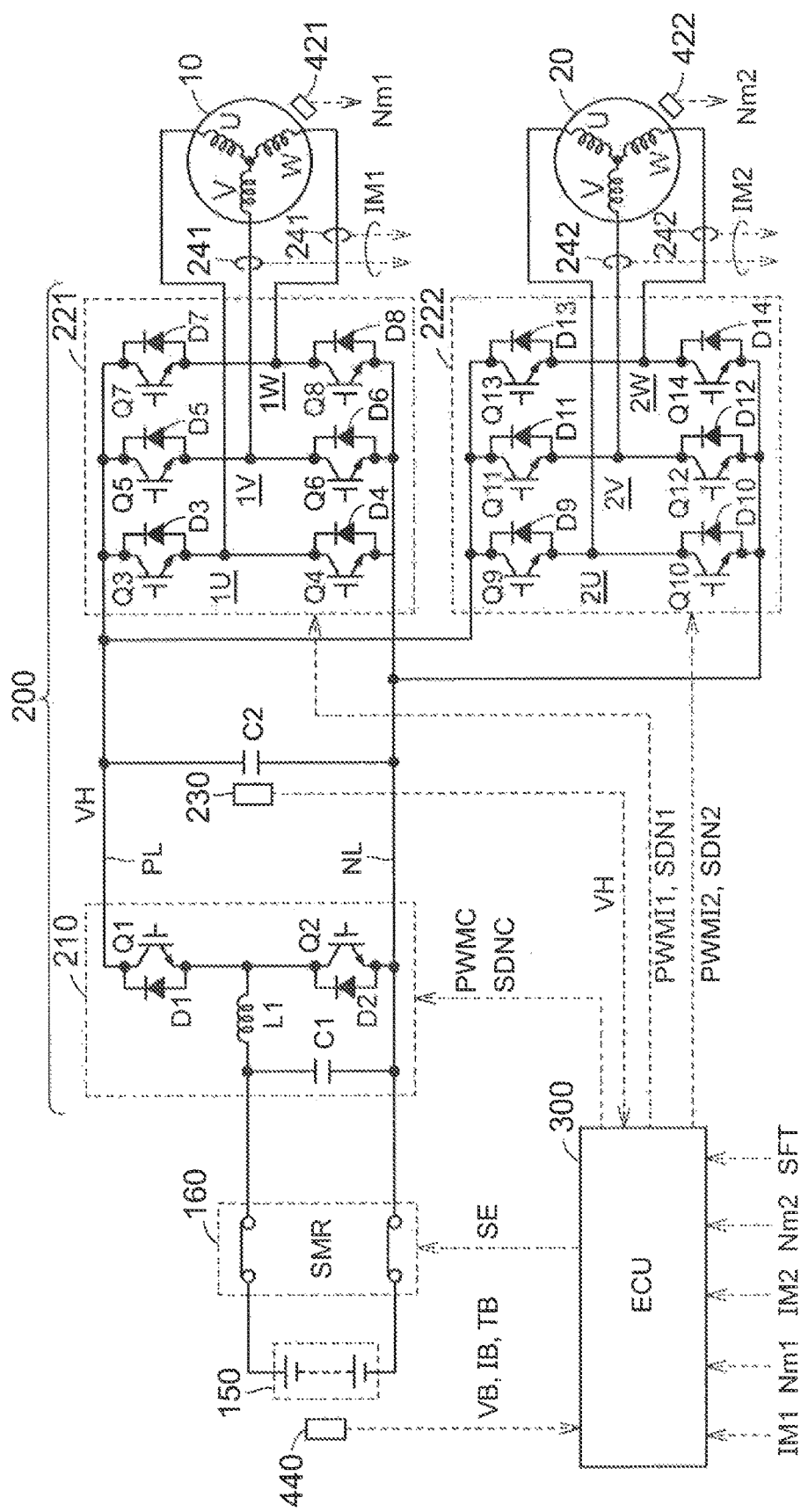
FIG. 2 is a circuit block diagram explaining the configuration of an electric system of the hybrid vehicle.

FIG. 2 is a circuit block diagram explaining the configuration of an electric system of the vehicle 1. The battery 150 is provided with a monitoring unit 440. The monitoring unit 440 detects the voltage (battery voltage) YB of the battery 150, input/output current IB of the battery 150, and the temperature TB of the battery 150, and outputs signals indicating the results of detection to the ECU 300.

The PCU 200 includes a capacitor C1, converter 210, capacitor C2, inverters 221, 222, voltage sensor 230, and current sensors 241, 242.

The capacitor C1 is connected in parallel with the battery 150. The capacitor C1 smooths the battery voltage VB, and supplies it to the converter 210.

The converter 210 includes a reactor L1, switching devices Q1, Q2, and diodes D1, D2. Each of the switching devices Q1, Q2 and switching devices Q3-Q14 that will be described later is an IGBT (Insulated Gate Bipolar Transistor), for example. The switching devices Q1, Q2 are connected in series with each other, between a power line PL and a power line NL that connect the converter 210 with the inverter 221. The diodes D1, D2 are connected in antiparallel between collectors and emitters of the switching devices Q1, Q2, respectively. One end of the reactor L1 is connected to the high-potential side of the battery 150. The other end of the reactor L1 is connected to an intermediate point between the switching device Q1 and the switching device Q2 (a connection point of the emitter of the switching device Q1 and the collector of the switching device Q2).

The converter 210 raises the battery voltage YB, according to a control signal PWMC of PWM (Pulse Width Modulation) method for causing each of the switching devices Q1, Q2 to perform switching operation, and supplies the raised voltage to the power lines PL, NL. The converter 210 also steps down the DC voltage across the power lines PL, NL, which voltage is supplied from one or both of the inverter 221 and the inverter 222, according to the control signal PWMC, and charges the battery 150 with the DC power. On the other hand, if the converter 210 receives a gate cut-off signal SDNC from the ECU 300, each of the switching devices Q1, Q2 is brought into a non-conductive state. As a result, the converter 210 is brought into a gate cut-off state.

The capacitor C2 is connected in parallel with the converter 210. The capacitor C2 smooths DC voltage supplied from the converter 210, and supplies it to the inverters 221, 222.

The voltage sensor 230 detects voltage across the opposite ends of the capacitor C2, namely, voltage (which will also be referred to as "system voltage") VH between the power line PL and the power line NL, and outputs a signal indicating the result of detection, to the ECU 300.

The inverter 221 includes a U-phase arm 1U, V-phase arm 1V, and a W-phase arm 1W. These arms 1U, 1V, 1W are connected in parallel with each other between the power line PL and the power line NL. The U-phase arm 1U has switching devices Q3, Q4 connected in series with each other. The V-phase arm 1V has switching devices Q5, Q6 connected in series with each other. The W-phase arm 1W has switching devices Q7, Q8 connected in series with each other. Diodes D3-D8 are respectively connected in antiparallel between collectors and emitters of the corresponding switching devices Q3-Q8. An intermediate point of each phase arm is connected to a corresponding phase coil of the motor-generator 10. Namely, one ends of three coils, i.e., U-phase, V-phase and W-phase coils, of the motor-generator 10 are connected in common to a neutral point. The other end of the V-phase coil is connected to an intermediate point of the switching devices Q3, Q4. The other end of the V-phase oil is connected to an intermediate point of the switching devices Q5, Q6. The other end of the W-phase oil is connected to an intermediate point of the switching devices Q7, Q8.

When the system voltage VH is supplied to the inverter 221, the inverter 221 converts DC voltage into AC voltage and drives the motor-generator 10, according to a control signal PWMI of PWM method for causing each of the switching devices Q3-Q8 to perform switching operation. As a result, the motor-generator 10 is driven so as to generate torque specified by a torque command value. On the other hand, if the inverter 221 receives a gate cutoff signal SDN1 from the ECU 300, each of the switching devices Q3-Q8 is brought into a non-conductive state. As a result, the inverter 221 is placed in a gate cut-off state. Since the configuration of the inverter 222 is substantially the same as that of the inverter 221, its explanation will not be repeated.

The current sensor 241 detects current (which will also be referred to as "motor current") IM1 that flows through the motor-generator 10, and outputs a signal indicating the result of detection to the ECU 300. In the following description, the direction from the motor-generator 10 toward the battery 150 will be denoted as positive direction of the motor current IM1. Like the current sensor 241, the current sensor 242 detects current IM2 that flows through the motor-generator 20, and outputs a signal indicating the result of detection to the ECU 300.

The ECU 300 enables the vehicle 1 to travel in either a normal mode or a limp-home mode. In the normal mode, the vehicle 1 travels while switching as needed between EV traveling and HV traveling. In other words, in the normal mode, the motor-generators 10, 20 are permitted to be electrically driven by the inverters 221, 222. The traveling in the normal mode will be called "normal traveling".

In the limp-home mode, the inverters 221, 222 are placed in gate cut-off states, and the engine 100 is driven so as to run the vehicle 1 in a limp-home fashion, when the inverters 221, 222 cannot normally perform operation to electrically drive the motor-generators 10, 20, due to a failure of a component, such as a resolver 421, 422 or a current sensor 241, 242, for example. In other words, in the limp-home mode, the inverters 221, 222 are inhibited from electrically driving the motor-generators 10, 20. The traveling in the limp-home mode will be called "inverterless traveling", and control for effecting inverterless traveling will be called "inverterless traveling control".

Figure 3:
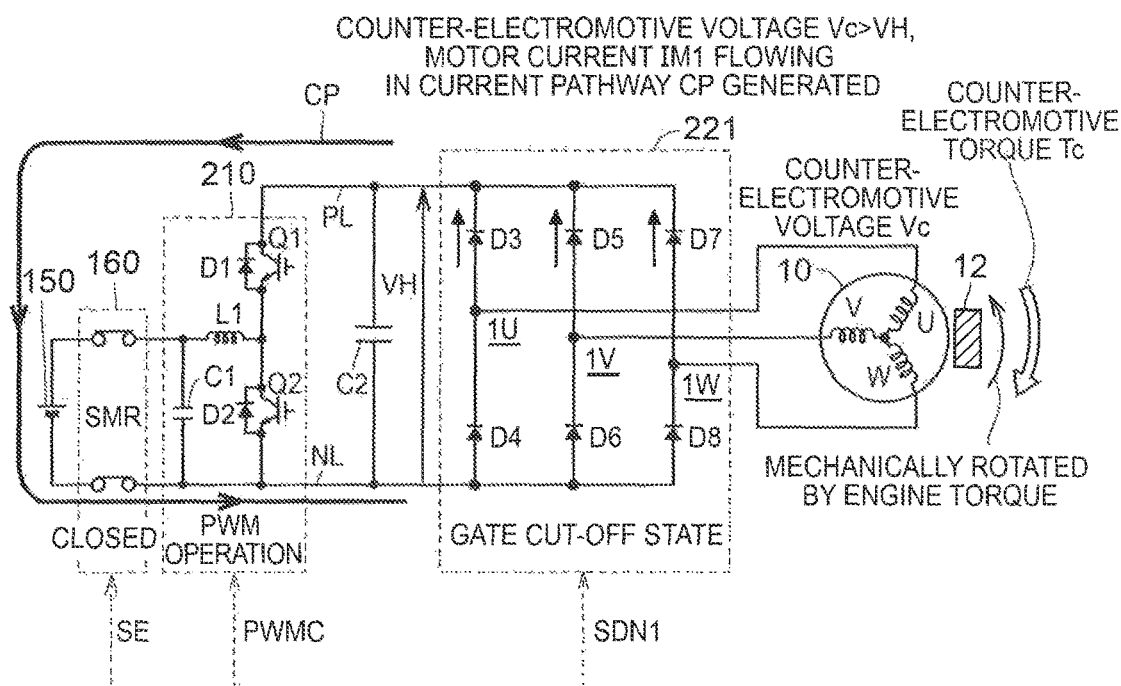
FIG. 3 is a view schematically showing the configuration of the electric system during inverterless traveling control.

FIG. 3 is a view schematically showing the configuration of the electric system during inverterless traveling control. During inverterless traveling control, all of the switching devices Q3-Q8 included in the inverter 221 are brought into non-conductive states, in response to the gate cut-off signal SDN1. Therefore, the diodes D3-D8 included in the inverter 221 constitute a three-phase thin wave rectifier circuit. Similarly, all of the switching devices Q9-Q14 (see FIG. 2) included in the inverter 222 are brought into non-conductive states, in response to a gate cut-off signal SDN2, though not illustrated in the drawing. Therefore, the diodes D9-D14, included in the inverter 222 constitute a three-phase full wave rectifier circuit. Meanwhile, in the converter 210, switching operation (PWM operation) of the switching devices Q1, Q2 responsive to the control signal PWMC is continued.

Since the engine 100 is driven during inverterless traveling control, engine torque Te is generated from the engine 100. With the engine torque Te, the motor-generator 10 is mechanically (dynamically) rotated. Since the motor-generator 10 is a permanent magnet synchronous motor, the rotor of the motor-generator 10 is provided with a permanent magnet 12. Therefore, a counter-electromotive voltage Vc is developed when the permanent magnet 12 is rotated by the engine torque Te. If the counter-electromotive voltage Vc becomes higher than the system voltage VH, the diodes D3, D5, D7 are bought into conductive states. Accordingly, motor current IM1 flows through a current pathway CP between the motor-generator 10 and the battery 150, and electric power is generated by the motor-generator 10. At this time, counter-electromotive torque Tc that acts in such a direction as to impede rotation of the motor-generator 10 is generated in the motor-generator 10.

Figure 4:
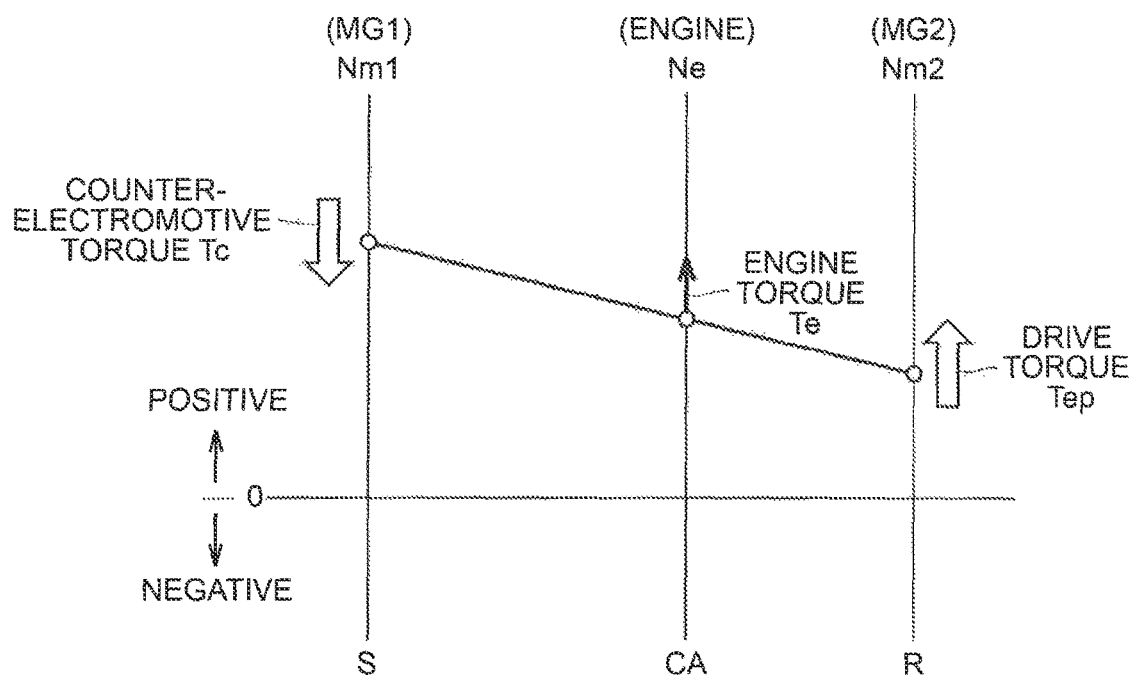
FIG. 4 is a nomographic chart explaining the behavior of each rotational element during inverterless traveling control.

FIG. 4 is a nomographic chart explaining the behavior of each rotational element during inverterless traveling control. Since the planetary gear mechanism 30 is constructed as explained above with reference to FIG. 1, the rotational speed of the sun gear S (=rotational speed Nm1), rotational speed of the carrier CA (=rotational speed Ne), and the rotational speed of the ring gear R (=rotational speed Nm2) have a relationship as shown in FIG. 4, namely, are connected by a straight line on the nomographic chart.

As described above, if the motor-generator 10 is mechanically rotated by the engine torque Te during inverterless traveling control, the motor-generator 10 generates counter-electromotive torque Tc in such a direction (negative direction) as to impede rotation of the motor-generator 10. With the counter-electromotive torque Tc applied from the motor-generator 10 to the sun gear S, drive torque Tep that acts in the positive direction as reaction force of the counter-electromotive torque Tc is generated in the ring gear R. With the drive torque Tep thus produced, the inverterless traveling of the vehicle 1 is realized.

The rotational speed Nm1, system voltage VH, counter-electromotive voltage Vc, motor current IM1, and the counter-electromotive torque Tc have relationships as described below.

Figure 5:
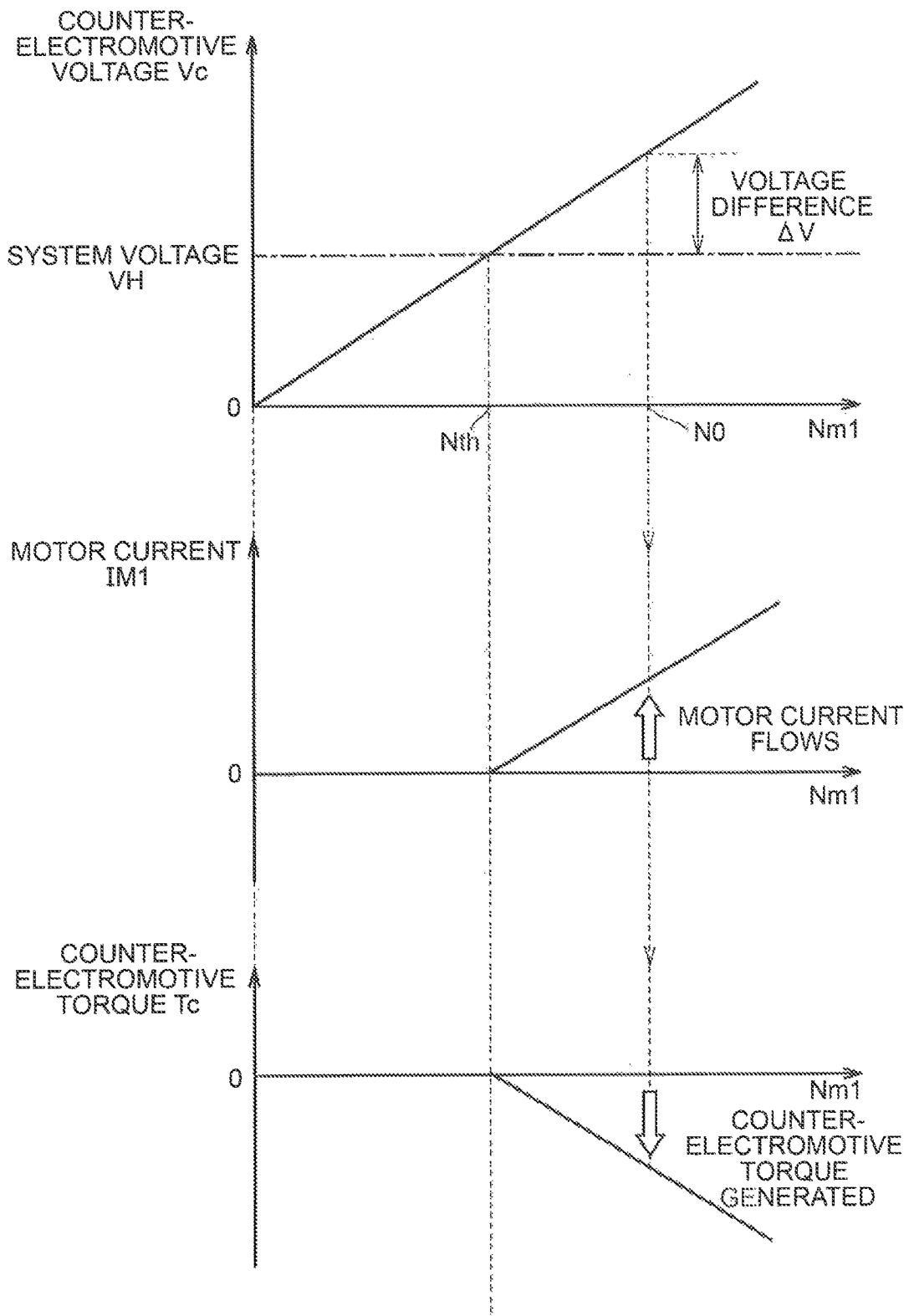
FIG. 5 is a view useful for explaining the relationship between the rotational speed of a first motor-generator, and a system voltage, counter-electromotive voltage, current flowing through the first motor-generator, and counter-electromotive torque.
Figure 8:
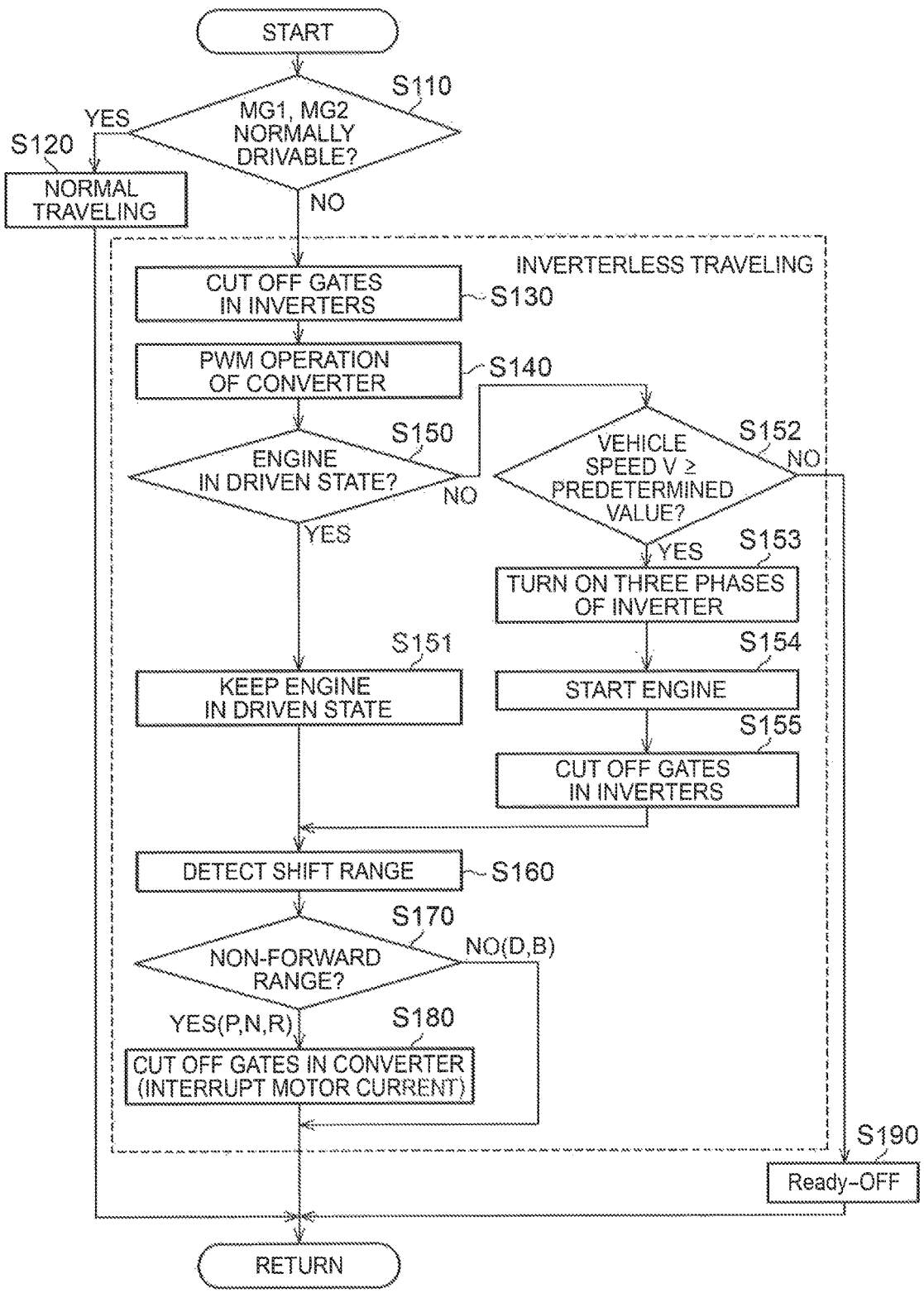
FIG. 8 is a flowchart illustrating traveling control in the hybrid vehicle according to the first embodiment.

FIG. 5 is a view explaining the relationships among the rotational speed Nm1, system voltage VH, counter-electromotive voltage Vc, motor current IM1, and the counter-electromotive torque Tc. In FIG. 5 and FIG. 8 that will be described later, the horizontal axis indicates the rotational speed Nm1. The vertical axis in the upper section of FIG. 5 indicates the counter-electromotive voltage Vc, and the vertical axis in the middle section indicates the motor current IM1, and the vertical axis in the lower section indicates the counter-electromotive torque Tc.

As shown in FIG. 5, the counter-electromotive voltage Vc has a characteristic that its value becomes higher as the rotational speed Nm1 is higher. In a region where the rotational speed Nm1 is lower than Nth, the counter-electromotive voltage Vc is lower than the system voltage VH. Namely, where a voltage difference between the counter-electromotive voltage Vc and the system voltage VH is denoted as ΔV (=Vc−VH), the voltage difference ΔV is negative. In this case, the diodes D3, D5, D7 are in non-conductive states; therefore, the motor current IM1 does not flow through the current pathway CP from the motor-generator 10 to the battery 150, and no electric power is generated by the motor-generator 10. Accordingly, the counter-electromotive torque Tc is not generated.

On the other hand, in a region where the rotational speed Nm1 is higher than Nth, the counter-electromotive voltage Vc is higher than the system voltage VH, and the voltage difference ΔV becomes positive. Therefore, the diodes D3, D5, D7 are brought into conductive states, and the motor current IM1 flows through the current pathway CP. As the voltage difference ΔV is larger, the motor current IM1 increases. Also, the counter-electromotive torque Tc is generated in the motor-generator 10, and the drive torque Tep is generated as reaction force of the counter-electromotive torque Tc.

When the shift range is changed over to a non-forward range while the vehicle 1 is temporarily stopped, for example, during inverterless traveling control, it is possible to prevent generation of the counter-electromotive torque Tc and the resulting drive torque Tep, by stopping the engine 100. However, since the inverter 221 is in the gate cut-off state during inverterless traveling control, the engine 100 may not be restarted by cranking, using the motor-generator 10, if the engine 100 is once stopped. As a result, the vehicle 1 may not be able to continue limp-home traveling.

Thus, when the shift range is any of the non-forward ranges during inverterless traveling control, it is desired to continue limp-home traveling by keeping the engine 100 in a driven state, while preventing occurrence of the drive torque Tep caused by the counter-electromotive torque Tc that becomes unnecessary torque.

Thus, in this embodiment, when the shift range is a non-forward range during inverterless traveling control, an arrangement for interrupting motor current IM1 that flows between the motor-generator 10 and the battery 150 is employed. With this arrangement, the counter-electromotive torque Tc is prevented from being generated by the motor-generator 10, so that the vehicle can continue limp-home traveling while preventing generation of drive torque Tep, without stopping the engine 100, as explained below with reference to FIG. 6 and FIG. 7.

Figure 6:
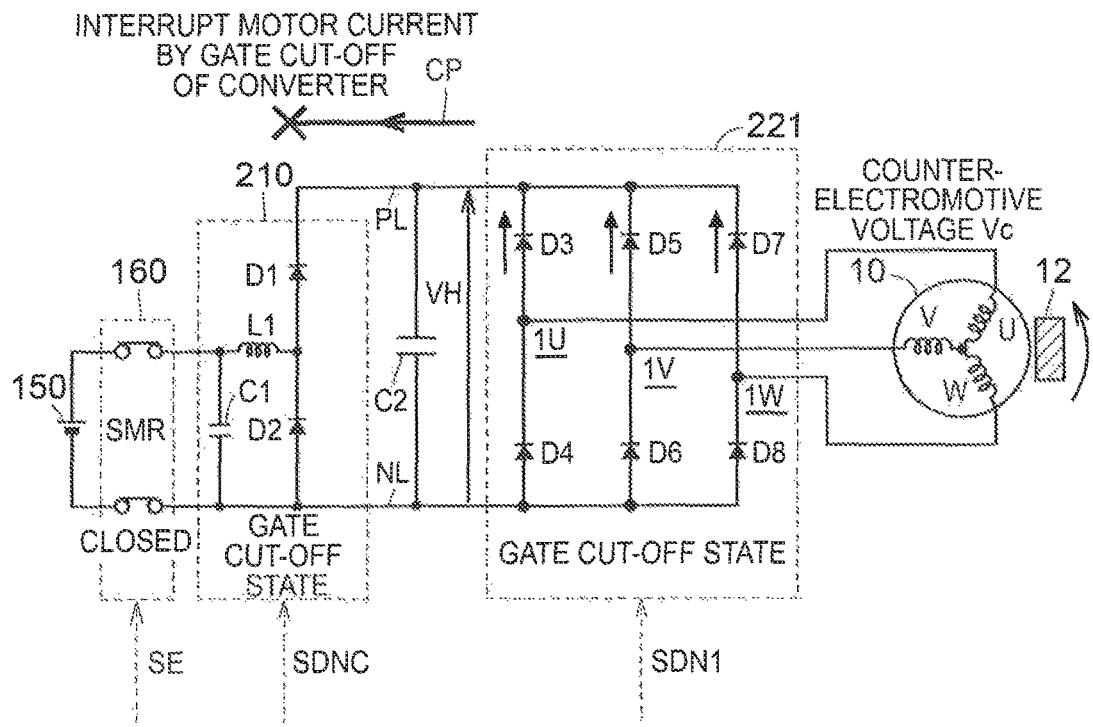
FIG. 6 is a view schematically showing the configuration of the electric system when current flowing through a current pathway is interrupted during inverterless traveling control.

FIG. 6 is a view schematically showing the configuration of the electric system in the case where motor current IM1 that flows through the current pathway CP is interrupted in the first embodiment. In the first embodiment, the converter 210 is brought into the gate cut-off state in response to the gate cut-off signal SDNC, so that the motor current IM1 is interrupted. Namely, since all of the inverters 221, 222 and the converter 210 are placed in gate cut-off states, no current flows in either of the direction from the motor-generator 10 to the battery 150, and the direction from the battery 150 to the motor-generator 10. The SMR 160 is kept in the closed state.

Figure 7:
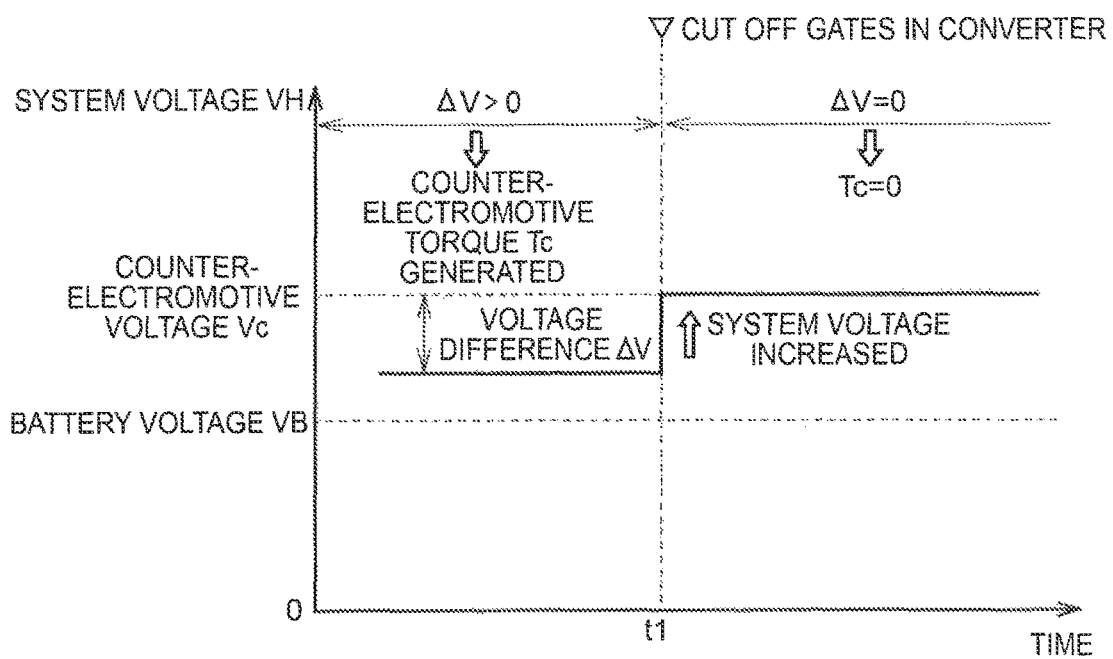
FIG. 7 is a time chart explaining the behavior of counter-electromotive torque when a converter is placed in a gate cut-off state in the first embodiment.

FIG. 7 is a time chart explaining the behavior of the counter-electromotive torque Tc when the converter 210 is placed in the gate cut-off state during inverterless traveling control. In FIG. 7, the horizontal axis indicates elapsed time, and the vertical axis indicates the system voltage VH. FIG. 7 shows the case where the counter-electromotive voltage Vc is higher than the battery voltage VB.

Suppose the case where the system voltage VH is located between the battery voltage VB and the counter-electromotive voltage Vc. Before time t1, the voltage difference ΔV between the counter-electromotive voltage Vc and the system voltage VH is positive. Namely, since the system voltage VH is lower than the counter-electromotive voltage Vc, the motor current IM1 can flow from the motor-generator 10 to the battery 150, via the capacitor C2, converter 210, and the SMR 160. As a result, counter-electromotive torque Te is generated in the motor-generator 10.

If the converter 210 is brought into the gate cut-off state at time t1, the motor current IM1 flows from the motor-generator 10 to the capacitor C2, but no charge transfer from the capacitor C2 to the capacitor C1 takes place. Therefore, the system voltage VH increases as compared with that before time 1. If the system voltage VH reaches the counter-electromotive voltage Vc, namely, if charging of the capacitor C2 is completed, and the voltage difference ΔV becomes equal to 0, the motor current IM1 stops flowing. Accordingly, the counter-electromotive torque Tc (absolute value) generated in the motor-generator 10 also becomes equal to 0.

Thus, according to the first embodiment, the converter 210 is brought into the gate out-off state, so that the motor current IM1 flowing through the current pathway CP is interrupted. As a result, the counter-electromotive torque TC ceases to be generated. Consequently, it is possible to prevent drive torque Tep as reaction force of the counter-electromotive torque Tc from being generated, without stopping the engine 100.

FIG. 8 is a flowchart illustrating traveling control in the vehicle 1 according to the first embodiment. Control routines according to the flowcharts shown in FIG. 8 and FIG. 11 or FIG. 13 that will be described later are executed when called for from a main routine each time a given condition is satisfied or a given period elapses. While each step (that will be abbreviated as "S" below) of this flowchart is basically implemented through software processing by the ECU 300, it may be implemented through hardware processing using an electronic circuit fabricated in the ECU 300.

In S110, the ECU 300 determines whether the inverters 221, 222 can normally perform operation to electrically drive the motor-generators 10, 20. If the motor-generators 10, 20 can be normally driven (YES in S110), the ECU 300 proceeds to S120, and sets the control mode to the normal mode, to effect normal traveling of the vehicle 1. Then, the ECU 300 returns to the main routine.

If, on the other hand, the motor-generators 10, 20 cannot be normally driven (NO in S110), the ECU 300 sets the control mode to the limp-home mode, and performs inverterless traveling of the vehicle 1, in S130-S180. In the following, the inverterless traveling control of the vehicle 1 will be described in detail.

In S130, the ECU 300 outputs the gate cut-off signals SDN1, SDN2, so as to bring the inverters 221, 222 into the gate cut-off states. In this manner, the inverters 221, 222 can be protected. Further, the ECU 300 outputs the control signal PWMC, so that the converter 210 performs PWM operation (S140).

In S150, the ECU 300 determines whether the engine 100 is in a driven state. If the engine 100 is already in the driven state (YES in S150), the ECU 300 keeps the engine 100 in the driven state (S151). Thus, drive torque Tep is generated, and inverterless traveling is realized. More specifically, the converter 210 performs PWM operation, so as to keep the current pathway CP in an electrically connected state (conductive state); therefore, the motor current IM1 can flow from the motor-generator 10 to the battery 150. The ECU 300 controls the engine 100 so as to adjust the rotational speed Ne, so that the rotational speed Nm1 is kept in a region (region in which the rotational speed Nm1 is higher than Nth in FIG. 5) in which the counter-electromotive voltage Vc is higher than the system voltage VH. As a result, the motor current IM1 continuously flows through the current pathway CP, so that counter-electromotive torque and drive torque Tep can be generated.

On the other hand, when the engine 100 is stopped (NO in S150), the ECU 300 determines whether the vehicle speed V is equal to or higher than a predetermined value (S152). This operation is performed so as to determine whether the engine 100 can be cranked by three-phase ON control of the inverter 221, as described below. The above-indicated predetermined value is determined in advance as a threshold value for determining whether the engine 100 can be cranked.

When the vehicle speed V is equal to or higher than the predetermined value, namely, when the vehicle 1 is traveling in the EV mode at a vehicle speed V higher than the predetermined value (YES in S152), the ECU 300 performs three-phase ON control of the inverter 221, so as to crank the engine 100 (S153).

Figure 9:
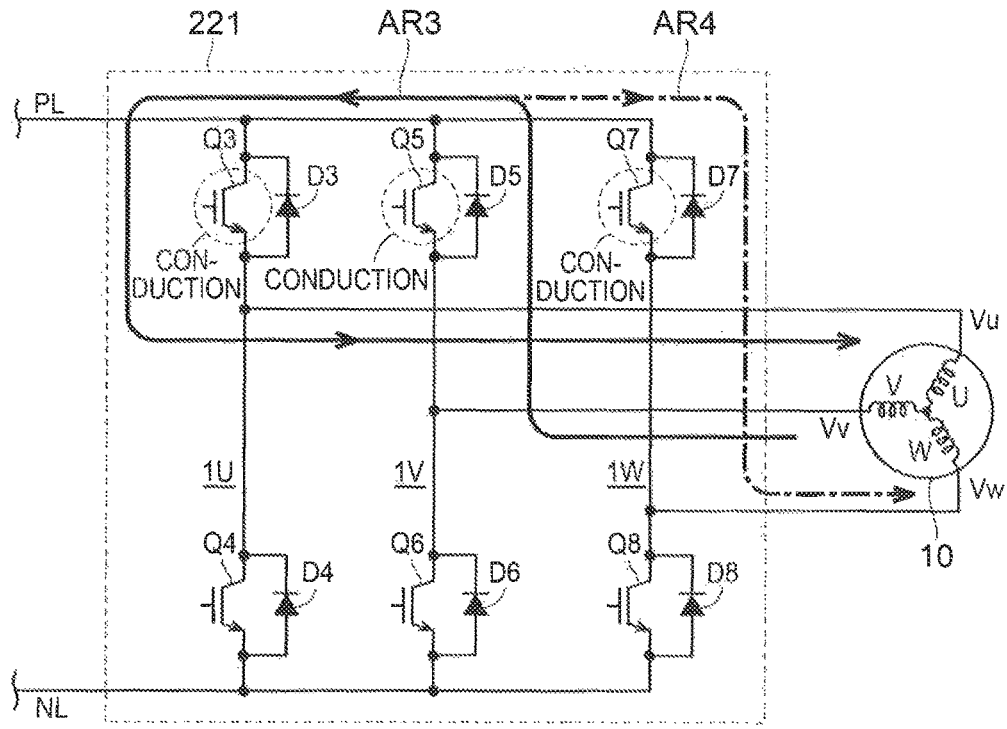
FIG. 9 is a view explaining three-phase ON control of an inverter.

FIG. 9 is a view explaining the three-phase ON control of the inverter 221. As shown in FIG. 9, under the three-phase ON control, all of the switching devices Q3, Q5, Q7 that constitute the upper arm of the inverter 221 are switched into conductive states. Alternatively, all of the switching devices Q4, Q6, Q8 that constitute the lower arm may be switched into conductive states. If the three-phase ON control is performed, so that current flows as indicated by arrows AR3, AR4, torque (drag torque) that acts on the motor-generator 10 in such a direction as to impede its rotation is generated. The engine 100 can be cranked by using this drag torque.

Referring back to FIG. 8, in S154, if the rotational speed Ne of the engine 100 reaches a reference value through cranking under the three-phase ON control, the ECU 300 performs injection of fuel and ignition, so as to start the engine 100. Then, the ECU 300 places the inverter 221 in the gate cut-off state again (S155).

As the rotational speed Nm1 of the motor-generator 10 is lower, drag torque generated under the three-phase ON control is reduced. For example, when the engine 100 is in a stopped state, and the vehicle is stopped (i.e., when the rotational speed Nm2 of the motor-generator 20 is 0), the rotational speed Nm1 is also equal to 0, as is understood from the relationship on the nomographic chart; therefore, no current flows, and no drag torque is generated, even if the three-phase ON control is performed. Therefore, the engine 100 cannot be cranked, and thus cannot be started. Thus, when the vehicle speed V is lower than the predetermined value in S152, namely, when the vehicle 1 is stopped with the engine 100 being in the stopped state, or when the vehicle 1 is traveling in the EV mode at a low speed (NO in S152), the ECU 300 brings the vehicle 1 into a state (Read-OFF state) in which the vehicle 1 is unable to travel with the electric system stopped.

In S160, the ECU 300 detects the shift range corresponding to the shift position SFT, based on a signal from the position sensor 510. Further, the ECU 300 determines whether the shift range thus detected is a non-forward range (S176).

When the shift range is a non-forward range, namely, when the shift range is P range, N range or R range (YES in S170), the ECU 300 proceeds to S180, and places the converter 210 in the gate cut-off state. This operation has been described in detail with reference to FIG. 6 and FIG. 7, and therefore, its explanation will not be repeated. Once the operation of S180 ends, the ECU 300 returns to the main routine.

On the other hand, when the shift range is a forward range, namely, when the shift range is D range or B range (NO in S170), the ECU 300 skips S180, and returns to the main routine. In this case, the motor-generator 10 is kept in a condition where the counter-electromotive torque Tc is generated; therefore, the vehicle 1 can obtain forward driving force, from drive torque Tep as reaction force of the counter-electromotive torque Tc.

As described above, according to the first embodiment, when the shift range is operated to a non-forward range during inverterless traveling control, the converter 210 is placed in the gate cut-off state, so that the motor current IM1 flowing through the current pathway CP between the motor-generator 10 and the battery 150 is interrupted. As a result, the counter-electromotive torque Tc is prevented from being generated by the motor-generator 10. This makes it possible to prevent drive torque Tep as reaction force of the counter-electromotive torque Tc from being generated, while continuing limp-home traveling by keeping the engine 100 in the driven state.

In the first embodiment, the method of interrupting the motor current IM1 by placing the converter 210 in the gate cut-off state has been described. In the second embodiment, when the shift range is a non-forward range during inverterless traveling control, the SMR 160 is opened so as to open the current pathway CP, thereby to interrupt the motor current IM1. The overall configuration of a hybrid vehicle and the configuration of its electric system according to the second embodiment are substantially the same as the overall configuration of the vehicle 1 (see FIG. 1) and the configuration of the electric system (see FIG. 2), respectively; therefore, explanation will not be repeated.

Figure 10:
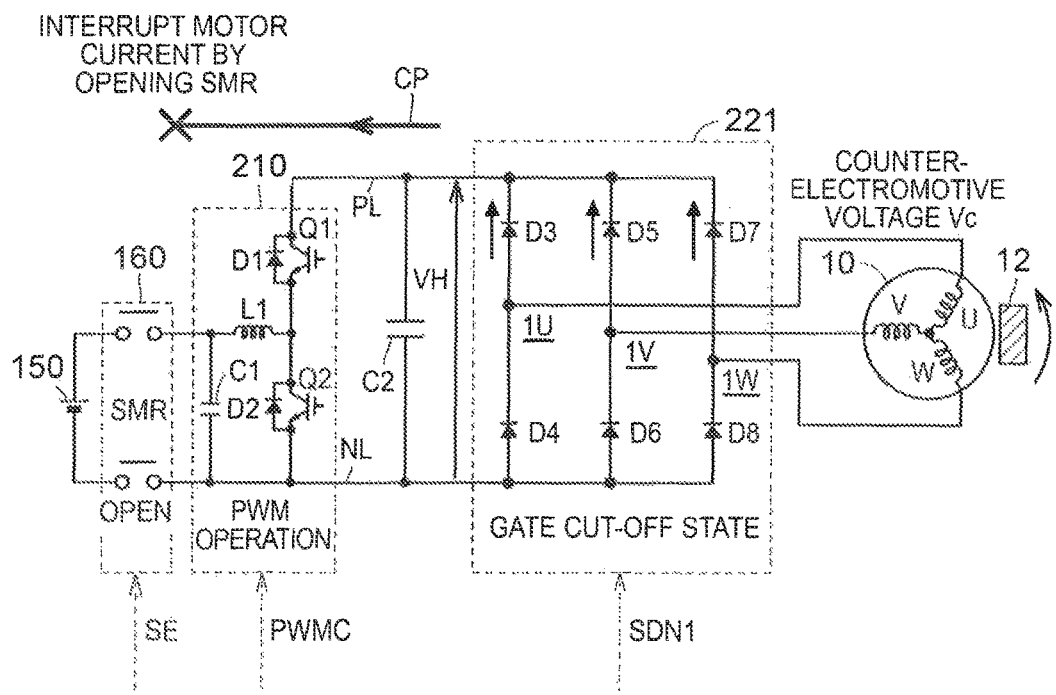
FIG. 10 is a view schematically showing the configuration of an electric system when current flowing through a current pathway is interrupted in a second embodiment.

FIG. 10 is a view schematically showing the configuration of the electric system when the motor current IM1 flowing through the current pathway CP is interrupted in the second embodiment. If the SMR 160 is opened, the system voltage VH increases as charging of the capacitor C2 proceeds, as in the first embodiment (see FIG. 7). Then, if the system voltage VH reaches the counter-electromotive voltage Vc, the motor current IM1 stops flowing, and the counter-electromotive torque Tc is not generated. Thus, in the second embodiment, too, the counter-electromotive torque Tc is prevented from being generated, so that the drive torque Tep can be prevented from being generated.

Then, if the shift range is changed over to a forward range, the SMR 160 is closed, so that the counter-electromotive torque Tc and the drive torque Tep caused by the torque Tc are generated again, and limp-home traveling can be resumed.

Figure 11:
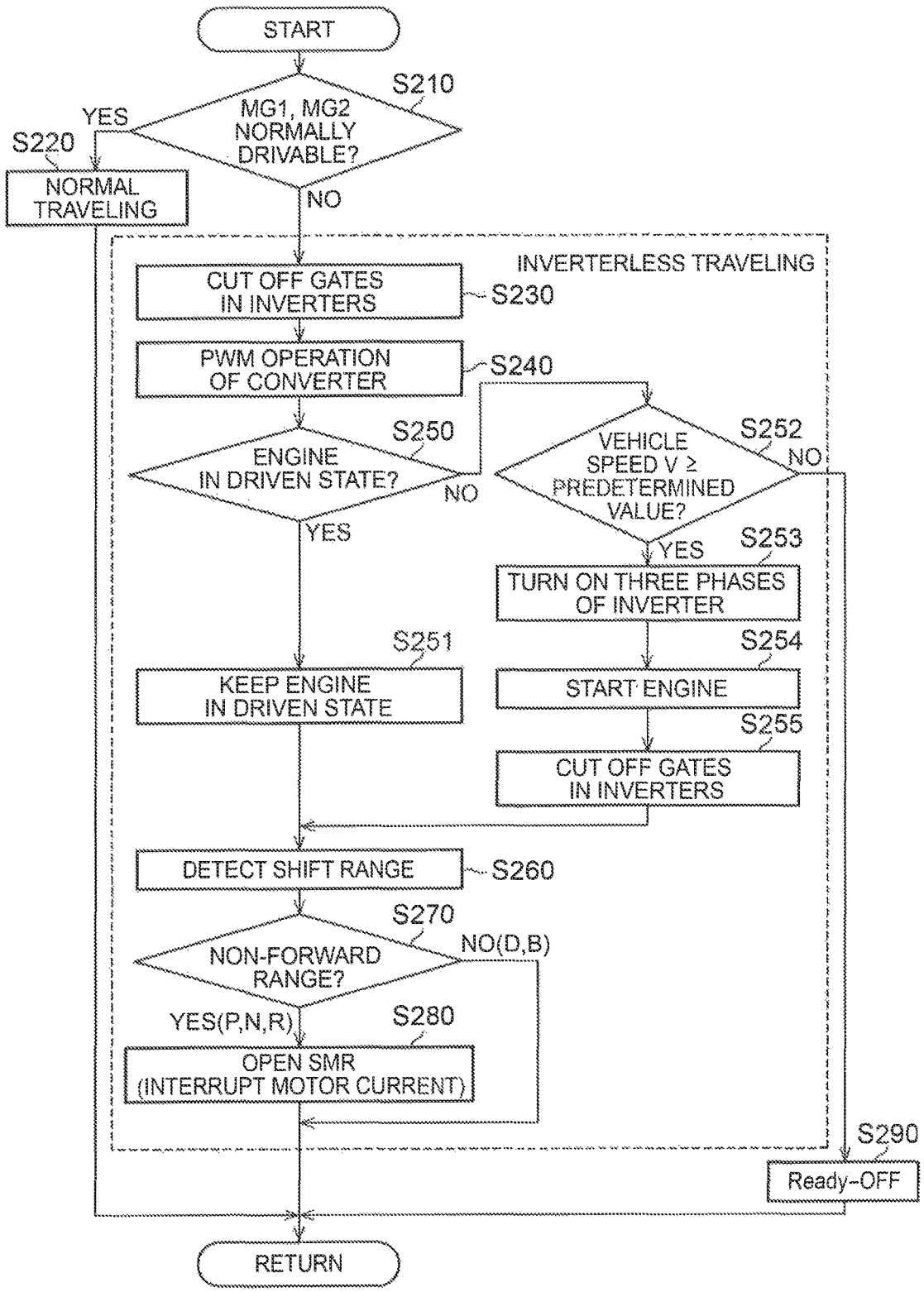
FIG. 11 is a flowchart illustrating traveling control in a hybrid vehicle according to the second embodiment.

FIG. 11 is a flowchart illustrating traveling control in the hybrid vehicle according to the second embodiment. When the processing illustrated in this flowchart is started, the SMR 160 is in the closed state. This flowchart is different from the flowchart (see FIG. 8) of the first embodiment, in that step S280 is included in place of step S180.

When the shift range is a non-forward range (YES in S270), the ECU 300 proceeds to S280, and opens the SMR 160 so as to open the current pathway CP, and interrupt the motor current IM1. As a result, the counter-electromotive torque Tc is prevented from being generated, so that the drive torque Tep can be prevented from being generated. The other steps in the flowchart shown in FIG. 11 are equivalent to the corresponding steps in the flowchart of the first embodiment (namely, steps S210-S270 and S290 are equivalent to steps S110-S170 and S190). Thus, detailed description of these steps will not be repeated.

As described above, according to the second embodiment, when the shift range is operated to a non-forward range during inverterless traveling control, the motor current IM1 that flows through the current pathway CP is interrupted by the SMR 160. Thus, since the counter-electromotive torque Tc is prevented from being generated by the motor-generator 10, it is possible to prevent the drive torque Tep from being generated while continuing to drive the engine 100, as in the first embodiment. Also, the use of the SMR 160 makes it possible to interrupt the motor current IM1 and prevent the drive torque Tep from being generated, even when the vehicle 1 is not equipped with the converter 210, though not illustrated in the drawings. As a result, limp-home traveling can be continued.

The SMR 160 corresponds to the "relay" according to the disclosure. While the SMR 160 is electrically connected between the battery 150 and the converter 210 in the above-described arrangement of the second embodiment, the "relay" according to the disclosure may be provided on the current pathway CP between the motor-generator 10 and the battery 150. Accordingly, the SMR 160 may be replaced with another relay included within the battery 150 or PCU 200, for example.

In the third embodiment, the motor current IM1 is interrupted by a suitably selected one of two methods, i.e., placing the converter 210 in the gate cut-off state, and opening the SMR 160.

Generally, the contact area of contacts of a relay is small while the relay is being opened, as compared with the case where the relay is in the closed state. Therefore, if the relay is opened, with no regard to somewhat large current flowing through the relay, the current may be concentrated on very small contact surfaces of the contacts, and fusing and adhesion of the contacts may occur. Thus, from the viewpoint of preventing fusing and adhesion of the contacts, it is desirable to open the relay when current is sufficiently small.

In the meantime, since the motor-generator 10 basically generates electric power at all times during inverterless traveling control, current flows constantly through the SMR 160. Accordingly, when the converter 210 can be controlled, it is preferable to interrupt the motor current IM1 by placing the converter 210 in the gate cut-off state as explained above in the first embodiment. Thus, it is possible to prevent generation of unnecessary drive torque Teq, while avoiding fusing and adhesion of the contacts of the SMR 160.

However, a situation where the shift range cannot be detected, thus making it impossible to control the converter 210 according to the shift range, may occur, depending on the configuration of the ECU 300, as will be explained below.

Figure 12:
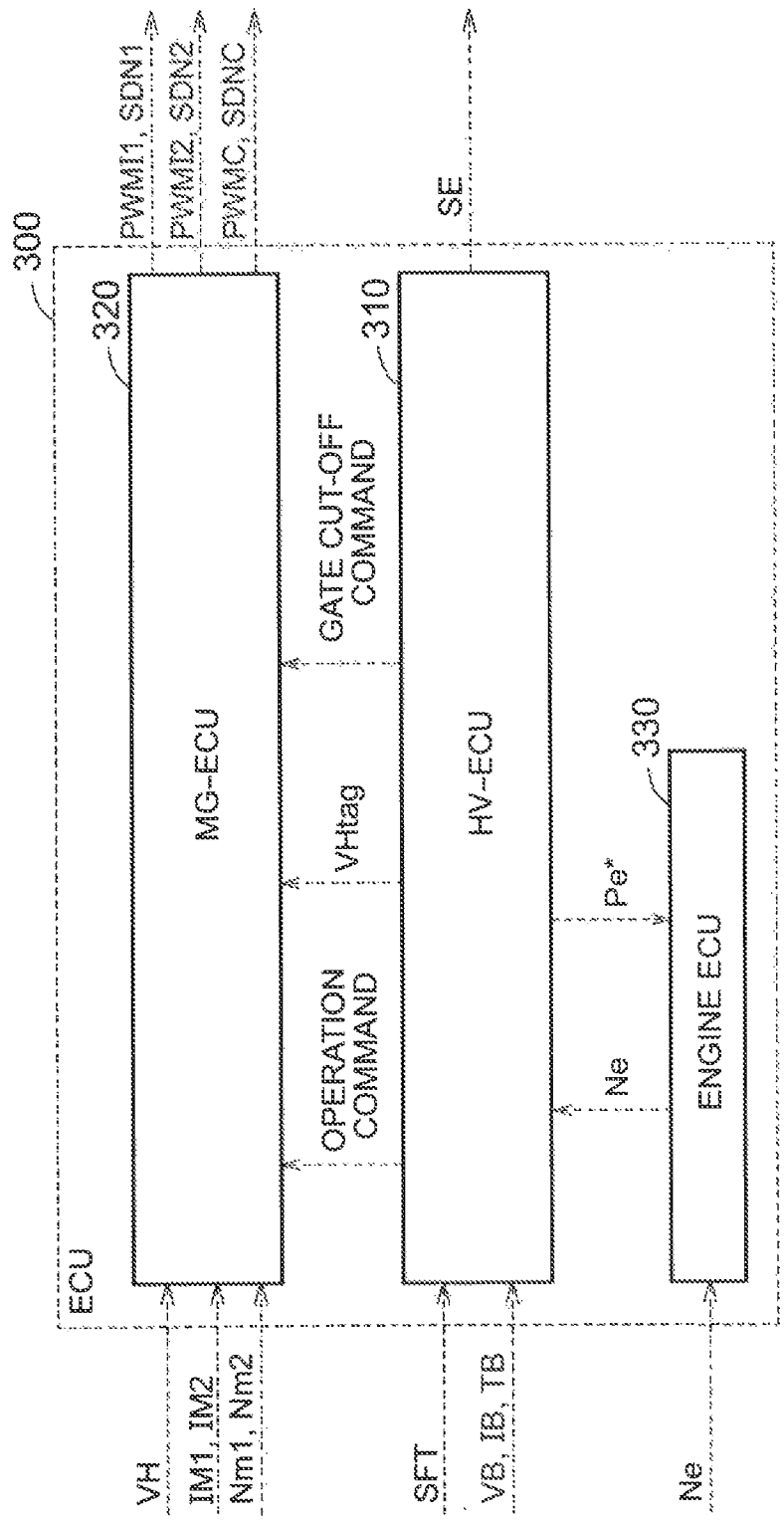
FIG. 12 is a view showing a configuration example of an ECU in a third embodiment.

FIG. 12 is a view showing a configuration example of the ECU 300 according to the third embodiment. The ECU 300 includes an HV-ECU 310, MG-ECU 320, and an engine ECU 330.

The HV-ECU (first control unit) 310 creates operation commands for the motor-generators 10, 20, and outputs the commands to the MG-ECU 320. The operation commands include operation permission command and operation inhibition command (namely, gate cut-off command for each inverter 221, 222) for each of the motor-generators 10, 20, torque command value for each of the motor-generators 10, 20, and respective command values of the rotational speeds Nm1, Nm2, for example.

The HV-ECU 310 also sets a target value (that will also be called "target system voltage") VHtag of the output voltage of the converter 210, and outputs a signal indicating the target value to the MG-ECU 320. The HV-ECU 310 generates a gate cut-off command for the converter 210, and outputs the command to the MG-ECU 320.

Further, the HV-ECU 310 determines the engine required power Pe*, and outputs a signal indicating the value to the engine ECU 330. The HV-ECU 310 creates a control signal SE for switching the SMR 160 between the open state and the closed state, and outputs the signal to the SMR 160.

The MG-ECU (second control unit) 320 receives the operation commands for the motor-generators 10, 20, target system voltage VHtag, and the gate cut-off command for the converter 210, from the HV-ECU 310. The MG-ECU 320 also receives signals (VH, IM1, IM2, Nm1, Nm2) from the voltage sensor 230, current sensors 241, 242, and the resolvers 421, 422.

The MG-ECU 320 controls the converter 210, so that the system voltage VH follows the target system voltage VHtag, based on the above-indicated command values, target system voltage VHtag, and respective signals. More specifically, the MG-ECU 320 creates a control signal PWMC, based on the system voltage VH and the target system voltage VHtag, and outputs the signal PWMC to the converter 210. If, on the other hand, the MG-ECU 320 receives the gate cut-off command for the converter 210 from the HV-ECU 310, the MG-ECU 320 creates a gate cut-off signal SDNC and outputs the signal to the converter 210.

Also, the MG-ECU 320 controls the inverters 221, 222 so that the motor-generators 10, 20 operate according to the operation commands received from the HV-ECU 310. Since the control of the inverter 221 is equivalent to the control of the inverter 222, the control of the inverter 221 will be typically described. When the MG-ECU 320 receives an operation permission command for the motor-generator 10 from the HV-ECU 310, it creates a control signal PWM1, based on the system voltage VH, motor current IM1 and the torque command value, and outputs the signal to the inverter 221. Un the other hand, when the MG-ECU 320 receives a gate cut-off command for the inverter 221 from the HV-ECU 310, it creates a gate cut-off signal SDN1 and outputs the signal to the inverter 221.

The engine ECU 330 receives the rotational speed Ne from the engine speed sensor 410, and outputs its value to the HV-ECU 330. The engine ECU 330 also controls fuel injection, ignition timing, valve timing, etc. of the engine 100, so that the engine 100 is driven at an operation point (target rotational speed and target engine torque) determined based on the engine required power Pe* determined by the HV-ECU 310.

With the ECU 300 configured as described above, when there is no abnormality in communication between the HV-ECU 310 and the MG-ECU 320, and the shift range is operated to a non-forward range, the motor current IM1 is interrupted by placing the converter 210 in the gate cut-off state. Thus, since the motor current IM1 can be interrupted without opening the SMR 160, contact adhesion in the SMR 160 can be avoided.

On the other hand, if a communication abnormality occurs, the gate cut-off command for the converter 210 cannot be transmitted from the HV-ECU 310 to the MG-ECU 320. Since the MG-ECU 320 does not receive the signal indicating the shift position SFT, the MG-ECU 320 cannot place the converter 210 in the gate cut-off state, even if the shift range is operated to a non-forward range. Accordingly, in the third embodiment, even if there is a possibility of contact adhesion in the SMR 160, the motor current IM1 is interrupted by opening the SMR 160 under control of the HV-ECU, and thus opening the current pathway CP. Namely when there is a communication abnormality, prevention of generation of the drive torque Tep is prioritized over avoidance of contact adhesion.

Thus, in the third embodiment, the motor current IM1 is interrupted by one of two methods, i.e., placing the converter 210 in the gate cut-off state, and opening the SMR 160, which one is selected depending on whether there is an abnormality in communication between the HV-ECU 310 and the MG-ECU 320.

Figure 13:
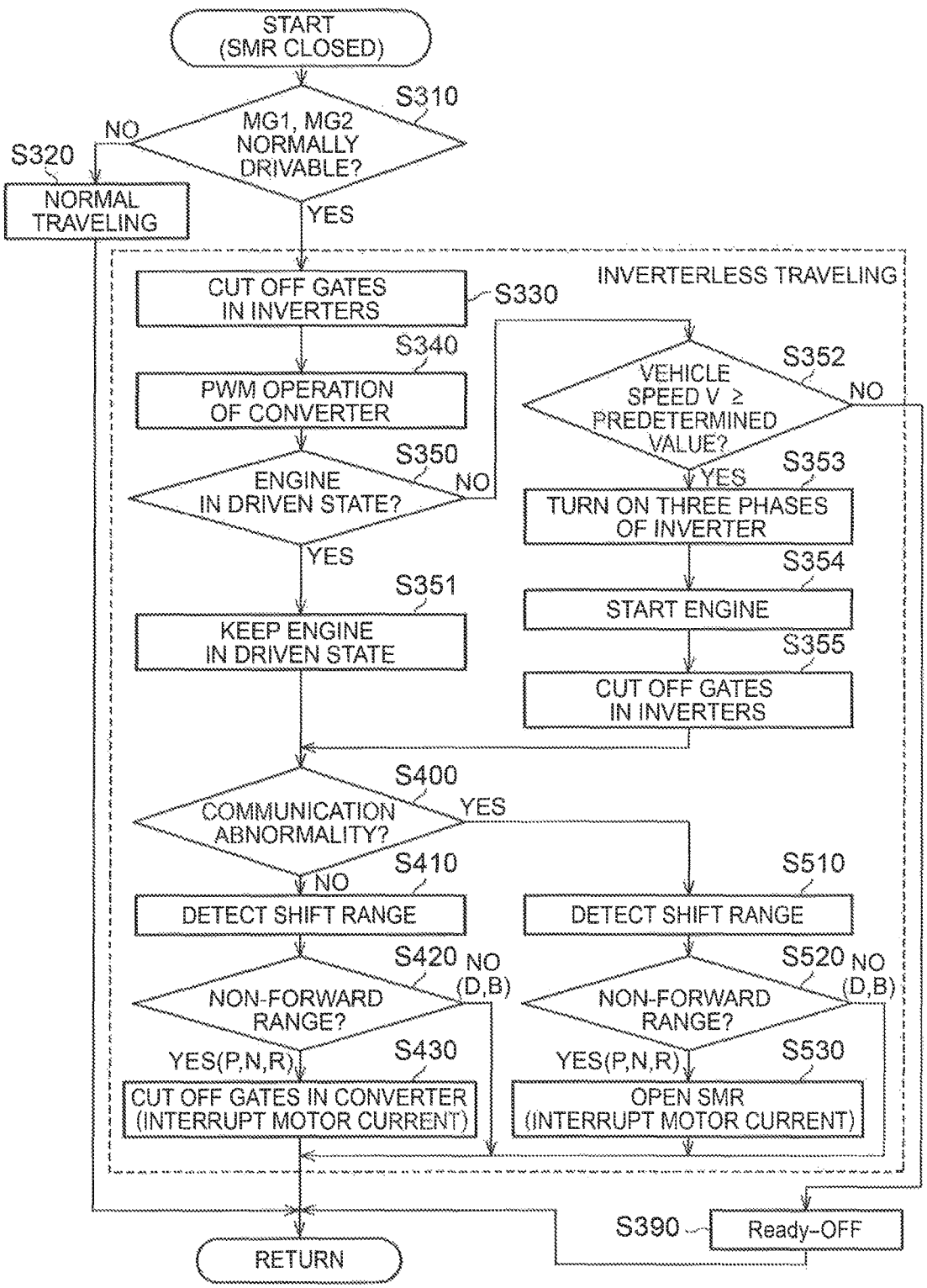
FIG. 13 is a flowchart illustrating traveling control in a hybrid vehicle according to the third embodiment.

FIG. 13 is a flowchart illustrating traveling control of the hybrid vehicle according to the third embodiment. When the processing illustrated in this flowchart is started, the SMR 160 is in the closed state. In the following description, the HV-ECU 310, MG-ECU 320 and the engine ECU 330 will be simply referred to as "ECU 300" when they are not distinguished from one another.

In S310, the ECU 300 determines whether the inverters 221, 222 can normally perform operation to electrically drive the motor-generators 10, 20. If the motor-generators 10, 20 can be normally driven (NO in S310), the ECU 300 proceeds to S320, to set the control mode to the normal mode, and perform normal traveling of the vehicle 1. Then, the ECU 300 returns to the main routine.

If the motor-generators 10, 20 cannot be normally driven (YES in S310), the ECU 300 sets the control mode to the limp-home mode, and performs inverterless traveling of the vehicle 1, in S330, S340, S350, and S351-S355. The processing of S330, S340, S350, S351-S355 is substantially the same as that of S130, S140, S150, S151-S155 (see FIG. 8) of the first embodiment, and therefore, will not be repeatedly explained.

In S400, the HV-ECU 310 determines whether there is an abnormality in communication between the HV-ECU 310 and the MG-ECU 320. If there is no communication abnormality (NO in S400), the HV-ECU 310 proceeds to S410, and detects the shift range corresponding to the shift position SFT, based on a signal from the position sensor 510. Then, the HV-ECU 310 determines whether the detected shift range is a non-forward range (S420).

If the shift range is a non-forward range (YES in S420), the HV-ECU 310 outputs the gate cut-off command for the converter 210 to the MG-ECU 320. In response to the gate cut-off command, the MG-ECU 320 places the converter 210 in the gate cut-off state, so as to interrupt the motor current IM1 (S430). On the other hand, when the shift range is a forward range (NO in S420), the HV-ECU 310 skips S430, and returns to the main routine. Namely, the PWM operation of the converter 210 is continued, so that the drive torque Tep continues to be generated.

On the other hand, when there is a communication abnormality in S400 (YES in S400), the HV-ECU 310 detects the shift range, based on the signal from the position sensor (S510). Then, the HV-ECU 310 determines whether the detected shift range is a non-forward range (S520).

If the shift range is a non-forward range (YES in S520), the HV-ECU 310 opens the SMR 160 so as to open the current pathway CP, and interrupt the motor current IM1 (S530). Thus, the counter-electromotive torque Tc is prevented from being generated, and therefore, the drive torque Tep can be prevented from being generated.

If, on the other hand, the shift range is a forward range (NO in S520), the HV-ECU 310 skips S530, and returns to the main routine. Namely, the SMR 160 is kept in the closed state. In this case, the counter-electromotive torque Tc is generated, so that the vehicle 1 can obtain driving force in the forward direction, from the drive torque Tep.

As described above, according to the third embodiment, when there is no abnormality in communication between the HV-ECU 310 and the MG-ECU 320, and the shift range is a non-forward range, the converter 210 is placed in the gate cut-off state, so that the motor current IM1 is interrupted. Thus, it is possible to prevent generation of the drive torque Tep, while avoiding contact adhesion in the SMR 160, and keeping the engine 100 driven. As a result, limp-home traveling can be continued. On the other hand, even in the case where there is an abnormality in the above communication, the motor current IM1 is interrupted by opening the SMR 160 under control of the HV-ECU 310. Namely, prevention of generation of the drive torque Tep is prioritized over avoidance of contact adhesion; therefore, the drive torque Tep can be prevented from being generated with higher reliability.

While the ECU 300 is divided into three units (HV-ECU 310, MG-ECU 320 and engine ECU 330) in the configuration example of the third embodiment, the HV-ECU 310 and the engine ECU 330 may be integrated into one unit. In another example, the ECU 300 may be divided into four or more units.

Figure 14:
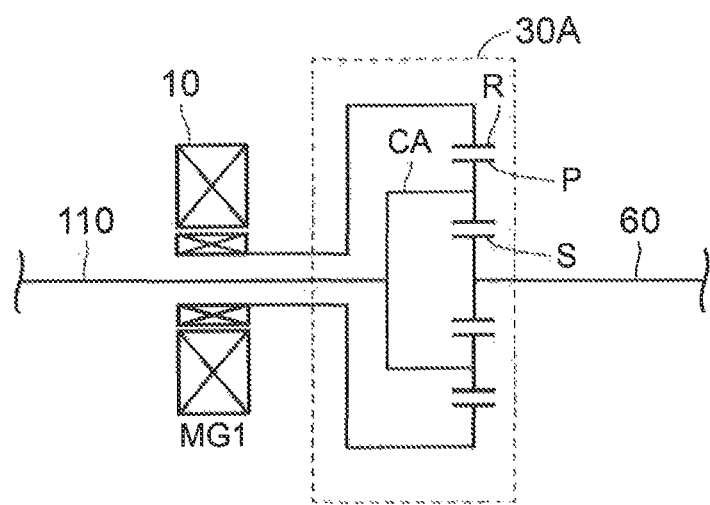
FIG. 14 is a view showing another example of a planetary gear mechanism.

In the first through third embodiments, the planetary gear mechanism 30 includes the sun gear S coupled to the rotor of the motor-generator 10, carrier CA coupled to the crankshaft 110 of the engine 100, and the ring gear R coupled to the output shaft 60. However, the "planetary gear mechanism" according to this disclosure is not limited to this arrangement, provided that it is arranged such that the reaction force of the output torque of the motor-generator acts on the output shaft. The "planetary gear mechanism" may be in the form of a planetary gear mechanism 30A as shown in FIG. 14, in place of the planetary gear mechanism 30. The planetary gear mechanism 30A has an arrangement in which the sun gear S is coupled to the output shaft 60, and the carrier CA is coupled to the crankshaft 110 of the engine 100, while the ring gear R is coupled to the rotor of the motor-generator 10, for example.

The disclosed embodiments are illustrative in all aspects, and thus they should not be considered as being restrictive. The scope of this disclosure is not limited by the above description, and includes all modifications to the disclosed embodiments.

What is claimed is:

1. A hybrid vehicle comprising:
an engine;
a first rotating electric machine including a permanent magnet in a rotor;
an output shaft connected to drive wheels;
a planetary gear mechanism that mechanically connects the engine, the first rotating electric machine, and the output shaft, such that reaction force of output torque of the first rotating electric machine acts on the output shaft, when the engine is in a driven state;
a second rotating electric machine connected to the output shaft;
a battery;
a first inverter configured to convert electric power between the battery and the first rotating electric machine;
a second inverter configured to convert electric power between the battery and the second rotating electric machine; and
an electronic control unit programmed to
a) perform inverterless traveling control, the inverterless traveling control being control for causing the hybrid vehicle to travel by placing the first inverter and the second inverter in a gate cut-off state, and driving the engine, and
b) interrupt current flowing between the first rotating electric machine and the battery when a shift range other than a forward range is selected, during the inverterless traveling control.

2. The hybrid vehicle according to claim 1, further comprising
a converter configured to raise a voltage applied from the battery and output the voltage to the first inverter or second inverter, wherein
the electronic control unit is programmed to interrupt the current flowing between the first rotating electric machine and the battery by placing the converter in a gate cut-off state.

3. The hybrid vehicle according to claim 1, further comprising
a relay provided on a pathway of current flowing between the first rotating electric machine and the battery, wherein
the electronic control unit is programmed to interrupt the current flowing between the first rotating electric machine and the battery by opening the relay.

4. The hybrid vehicle according to claim 1, wherein
the inverterless traveling control is control for causing the hybrid vehicle to travel using a torque applied to the output shaft by placing the first inverter and the second inverter in a gate cut-off state and driving the engine, the torque applied to the output shaft is a reaction force of a braking torque generated in the first rotating electric machine, and
the braking torque is generated by a current caused by a counter-electromotive voltage in the first rotating electric machine.

5. A hybrid vehicle comprising:
an engine;
a first rotating electric machine including a permanent magnet in a rotor;
an output shaft connected to drive wheels;
a planetary gear mechanism that mechanically connects the engine, the first rotating electric machine, and the output shaft, such that reaction force of output torque of the first rotating electric machine acts on the output shaft, when the engine is in a driven state;
a second rotating electric machine connected to the output shaft;
a battery;
an inverter configured to convert electric power between the battery, and the first rotating electric machine and the second rotating electric machine;
a converter configured to raise a voltage applied from the battery and output the voltage to the inverter;
a relay provided on a pathway of current flowing between the first rotating electric machine and the battery; and
an electronic control unit programmed to perform inverterless traveling control, the inverterless traveling control being control for causing the hybrid vehicle to travel by placing the inverter in a gate cut-off state and driving the engine, wherein
the electronic control unit is programmed to detect a shift range of the hybrid vehicle,
the electronic control unit includes a first control unit that controls the relay, and a second control unit that controls the converter, and
the first control unit is programmed to
interrupt the current flowing between the first rotating electric machine and the battery by placing the converter in a gate cut-off state, when there is no abnormality in communication between the first control unit and the second control unit and the shift range is a range other than the forward range, during the inverterless traveling control, and
interrupt the current flowing between the first rotating electric machine and the battery by opening the relay, when there is an abnormality in the communication between the first control unit and the second control unit and the shift range is a range other than the forward range, during the inverterless traveling control.

* * * * *